(12) United States Patent
Tour et al.

(10) Patent No.: US 8,183,180 B2
(45) Date of Patent: May 22, 2012

(54) GRAPHENE COMPOSITIONS AND DRILLING FLUIDS DERIVED THEREFROM

(75) Inventors: James M. Tour, Bellaire, TX (US);
Howard K. Schmidt, Cypress, TX (US);
Jay R. Lomeda, Houston, TX (US);
Dmitry V. Kosynkin, Houston, TX (US);
Condell D. Doyle, Nocona, TX (US)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 12/832,797

(22) Filed: Jul. 8, 2010

(65) Prior Publication Data
US 2011/0059871 A1    Mar. 10, 2011

Related U.S. Application Data

(63) Continuation of application No. 12/812,169, filed as application No. PCT/US2009/030498 on Jan. 18, 2011.

(60) Provisional application No. 61/019,765, filed on Jan. 8, 2008, provisional application No. 61/026,049, filed on Feb. 4, 2008, provisional application No. 61/026,377, filed on Feb. 5, 2008.

(51) Int. Cl.
*C09K 8/02* (2006.01)
*C01B 31/00* (2006.01)

(52) U.S. Cl. ............... 507/103; 423/414; 423/415.1; 507/129; 977/734; 977/737; 977/738

(58) Field of Classification Search .............. 507/103, 507/129; 423/414, 415.1; 534/488; 977/734, 977/737, 738
See application file for complete search history.

(56) References Cited

U.S. PATENT DOCUMENTS

| | | | |
|---|---|---|---|
| 4,491,796 A | 1/1985 | Smith | |
| 5,151,658 A | 9/1992 | Muramatsu et al. | |
| 6,250,848 B1 | 6/2001 | Moridis et al. | |
| 2007/0092432 A1* | 4/2007 | Prud'Homme et al. | 423/448 |

FOREIGN PATENT DOCUMENTS

| | | |
|---|---|---|
| JP | 2007084407 A | 4/2007 |
| WO | 2007047084 A2 | 4/2007 |

OTHER PUBLICATIONS

International Search Report and Written Opinion for PCT/US09/030498 mailed Sep. 10, 2009.
Stankovich, et al., "Stable aqueous dispersions of graphitic nanoplatelets via the reduction of exfoliated graphite oxide in the presence of poly(sodium 4-styrenesulfonate)", J. Mater. Chem., vol. 16, (2005), 155-158.
Stankovich, et al., "Synthesis of graphene-based nanosheets via chemical reduction of exfoliated graphite oxide", Carbon, vol. 45, (2007), 1558-1565.
Strano, et al., "Electronic structure control of single-walled carbon nanotube functionalization", Science, vol. 301, (2003), 1519-1522.
Marcoux, et al., "Electrochemical functionalization of nanotube films: growth of aryl chains on single-walled carbon nanotubes", New J. Chem., vol. 28, (2004), 302-307.
Moore, et al., "Individually suspended single-walled carbon nanotubes in various surfactants", vol. 3, (2003), 1379-1382.
Lomeda, et al, "Diazonium functionalization of surfactant-wrapped chemically converted graphene sheets", vol. 130, No. 48, (2008), 16201-16206.
Si, et al., "Synthesis of water soluble graphene", Nano Lett., vol. 8, (2008), 1679-1682.
International Search Report and Written Opinion for PCT/US09/030526 mailed Jun. 30, 2009.
Byerlee, et al., "A magnetic method for determining the geometry of hydraulic fractures", Pure Appl. Geophys., Birkhauser, Verlag, Basel, 114:1976, pp. 425-433.
Constable, et al., "Mapping thin resistors (and hydrocarbons) with marine EM methods: Insights from 1D modeling", Geophysics, 71:2006, pp. G43-G51.
Constable, et al., "An introduction to marine controlled-source electromagnetic methods for hydrocarbon exploration <ConstableSrnka.pdf>", Geophysics, 72:2007, pp. WA3-WA12.
Um, et al., "On the physics of the marine controlled source electromagnetic method", Geophysics, 72:2007, pp. WA13-WA26.
Wilt, et al., "Oil field reservoir characterization and monitoring using electromagnetic geophysical techniques", J. Petrol. Sci. Eng., 39:2003, pp. 85-97.
Yu, et al,. "On the imaging of radio-frequency electromagnetic data for cross-borehole mineral exploration", Geophys. J. Int., 135:1998, pp. 523-541.
Tseng, et al., "A borehole-to-surface electromagnetic survey", Geophysics, 63:1998, pp. 1565-1572.
Zhadanov, et al., "Underground imaging by frequency-domain electromagnetic migration", Geophyics, 61:1996, pp. 666-682.
Maurer, et al., "Design strategies for electromagnetic geophysical surveys", Inverse Problems, 16:2000, pp. 1097-1117.
Lee, et al., "A New Approach to Imaging with Low-Frequency Electromagnetic Fields", Geophysics, 58:1993, pp. 780-796.
Raj, et al., "Commercial Applications of Ferrofluids", J. Magnetism Mag. Mater., 85:1990, pp. 233-245.

* cited by examiner

*Primary Examiner* — Timothy J. Kugel
(74) *Attorney, Agent, or Firm* — Winstead PC

(57) ABSTRACT

Drilling fluids comprising graphenes and nanoplatelet additives and methods for production thereof are disclosed. Graphene includes graphite oxide, graphene oxide, chemically-converted graphene, and functionalized chemically-converted graphene. Derivatized graphenes and methods for production thereof are disclosed. The derivatized graphenes are prepared from a chemically-converted graphene through derivatization with a plurality of functional groups. Derivatization can be accomplished, for example, by reaction of a chemically-converted graphene with a diazonium species. Methods for preparation of graphite oxide are also disclosed.

22 Claims, 13 Drawing Sheets

GRAPHENE COMPOSITIONS AND DRILLING FLUIDS DERIVED THEREFROM

CROSS-REFERENCE TO RELATED APPLICATIONS

This application is a continuation of U.S. patent application Ser. No. 12/812,169, filed Jul. 8, 2010, which is a 35 U.S.C. §371 national stage application of PCT/US2009/030498, filed Jan. 8, 2009, which claims priority to U.S. Provisional Patent Applications 61/019,765, filed Jan. 8, 2008; 61/026,049, filed Feb. 4, 2008; and 61/026,377, filed Feb. 5, 2008. The entirety of each of the above-referenced applications are incorporated herein by reference.

STATEMENT REGARDING FEDERALLY SPONSORED RESEARCH

This invention was made with government support under Grant No. NNX07AI65G, awarded by the National Aeronautics and Space Administration; Grant No. 2007G010, awarded by the Federal Aviation Administration; and Grant No. FA-9550-06-1-0207, awarded by the U.S. Department of Defense. The government has certain rights in the invention.

BACKGROUND

Exploration and production of mineral deposits, primarily petroleum and natural gas, but also including, for example, water and various inorganic minerals, often involves the creation of boreholes with rotary cutters. Rock cuttings are continually removed from the borehole during the excavation process. In relatively shallow boreholes (less than a few hundred feet), rock removal is accomplished, for example, by injecting a compressed gas through a hollow drill stem. Rock cuttings are removed through an annulus between the drill stem and the bore hole. In deep boreholes or boreholes in geological formations housing water or other fluids, a liquid is used in like manner to remove rock cuttings. Such liquids are typically referred to as drilling fluids. Additives such as, for example, barite are often added to the drilling fluids to increase density such that the drilling fluid hydrostatic pressure at depth is greater than the hydrostatic pressure of fluids within the geological formation at like depth. The increase in drilling fluid density helps prevent fluids from the geological formations from entering the borehole and inhibits blowouts when high-pressure deposits are encountered during drilling.

Although drilling fluids confer numerous advantages to the drilling process, the drilling fluids are usually at sufficient pressures to invade permeable rock formations. Such permeation is undesirable, since it can interfere with petroleum recovery. Materials are often added to drilling fluids to plug pores in permeable rock formations by forming a filter cake that is impermeable to drilling fluid. For instance, bentonite, a clay, is commonly used for this purpose. Other additives such as, for example, cellulose, polymers, asphalt, GILSONITE® and calcium carbonate are sometimes added to improve filter cake properties. Although bentonite and similar materials reduce rock formation permeability, the filter cakes are not completely impermeable to the drilling fluid, which leads to several problematic situations. For example, penetration of water can cause clay formations to swell, which results in reduced production. Rocks such as, for example, shales can build up a pressure gradient from absorbed drilling fluid such that rock layers can spall off into the drilling fluid. This 'washout' can jam drill stems and generate rough surfaces that increase wear. Alternatively, the borehole can become plugged. Furthermore, when drilling fluid penetrates into rock, original fluid in the rock is displaced. When production potential is evaluated using logging tools, a potential production zone may be missed because of petroleum displacement by drilling fluid. Moreover, thick filter cakes can build up with additives currently in use, which increases wear on drill stems and reduces the annulus size for flow of drilling fluids. Another failure mode occurs when additives fail to prevent drilling fluid penetration into highly permeable, large-pore rock formations. Rapid flow of drilling fluids into such rock formations can hydraulically clamp the drill stein to the rock surface, resulting in a condition known as 'stuck pipe'.

In view of the foregoing, development of improved drilling fluid compositions that prevent or substantially reduce the penetration of drilling fluids into rock formations would be of considerable interest. Such drilling fluid compositions would provide benefits in drilling operations through, for example, reducing formation damage, producing thinner filter cakes, reducing fluid loss into rock formation pores, preserving original rock formation pressure, reducing wear on drilling tools, and reducing the likelihood of drill stem hydraulic adhesion or stuck pipe.

SUMMARY

In various embodiments, drilling fluids including a graphene are disclosed herein. In other various embodiments, methods for making drilling fluids including a graphene are disclosed herein. The methods include providing a graphene, providing a drilling fluid, and dispersing the graphene in the drilling fluid. In various embodiments, drilling fluids including a nanoplatelet additive are disclosed.

In various embodiments, derivatized graphenes are disclosed herein. The derivatized graphenes are chemically-converted graphenes. The chemically-converted graphenes are derivatized with a plurality of functional groups. In other various embodiments, methods for making derivatized graphenes are disclosed herein. The methods include providing a chemically-converted graphene and derivatizing the chemically-converted graphene with a plurality of functional groups.

In still other various embodiments, the present disclosure provides methods for preparing graphite oxide. The methods include suspending an elemental carbon source in a solution including sodium hypochlorite, heating the solution to provide a reacted mixture, and separating the reacted mixture to provide a supernatant phase. The elemental carbon source is selected from a group including, for example, a graphite, a carbon black, and combinations thereof. In some embodiments, the supernatant phase is acidified to provide a crude graphite oxide, and the crude graphite oxide is optionally purified by dialysis.

The foregoing has outlined rather broadly various features of the present disclosure in order that the detailed description that follows may be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
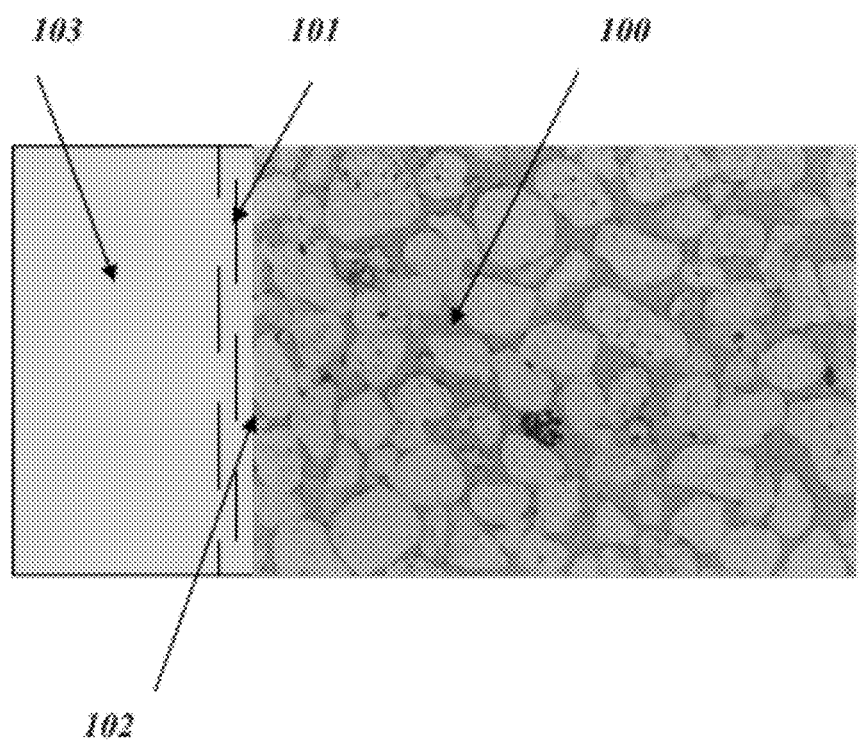
FIG. 1 presents a schematic illustration of a proposed mechanism whereby drilling fluids including a graphene can prevent or substantially reduce drilling fluid penetration into rock formations.

In the following description, certain details are set forth such as specific quantities, concentrations, sizes, etc. so as to provide a thorough understanding of the various embodiments disclosed herein. However, it will be apparent to those skilled in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Furthermore, drawings are not necessarily to scale.

While most of the terms used herein will be recognizable to those of skill in the art, the following definitions are nevertheless put forth to aid in the understanding of the present disclosure. It should be understood, however, that when not explicitly defined, terms should be interpreted as adopting a meaning presently accepted by those of skill in the art.

"Chemically-converted graphene," as used herein, refers to, for example, a graphene produced by a reduction of graphite oxide. A reduction of graphite oxide to chemically-converted graphene removes at least a portion of oxygen functionalities from the graphite oxide surface.

"Functionalized chemically-converted graphene," as used herein, refers to, for example, a chemically-converted graphene that has been derivatized with a plurality of functional groups.

"Graphene," as defined herein, refers to, for example, a single graphite sheet that is less than about 100 carbon layers thick, and typically less than about 10 carbon layers thick. As used herein, the terms graphene and graphene sheets are used synonymously. As used herein, graphene refers to, for example, graphene oxide, graphite oxide, chemically-converted graphene, functionalized chemically-converted graphene and combinations thereof.

"Graphene oxide," as defined herein refers to, for example, a specific form of graphite oxide of less than about 100 carbon layers thick, and typically less than about 10 carbon layers thick.

"Graphite oxide," as defined herein, refers to, for example, oxidized graphite having any number of carbon layers.

"Graphitic," as defined herein, refers to, for example, graphene and graphite layers.

The present disclosure describes graphene compositions for preventing or substantially reducing the penetration of drilling fluids into rock formations, such as, for example, during drilling operations. The use of graphene or similar nanoplatelet additives in drilling applications offers several advantages over conventional additives, which are generally spherical. Alternative nanoplatelet additives include for example, exfoliated clays used for production of nanocomposite materials (e.g., montmorillonite) and expanded and mechanically sheared mica. Pore-blocking efficiency of clays and other nanoplatelet materials arises as a result of their similar geometry and ability to be suspended in a drilling fluid, much like graphene compositions. Graphene sheets used in drilling operations provide the opportunity to produce very thin filter cakes of about 1 nm to about 1 μm thickness in some embodiments, about 1 nm to about 10 nm thickness in other embodiments, and about 10 nm to about 100 nm thickness in still other embodiments. Such thin filter cakes preserve a pumping annulus for introduction of drilling fluid and eliminate or substantially reduce wear on drill stems by the filter cakes. Furthermore, natural lubricity of graphene, similar to that of graphite, reduces wear and friction on drill stems within boreholes. As illustrated in FIG. 1, drilling fluids including a graphene reduce drilling fluid penetration into rock pores of pristine geological formation 100. For example, graphene sheets 101 block rock pores 102 from penetration by drilling fluid 103. The graphene sheets prevent or substantially reduce penetration of drilling fluid 103 into the interior of pristine geological formation 100. The graphene sheets are desirably thin but are sufficiently strong and flexible and of sufficient size to span at least one pore of the rocks forming the interior of a borehole. Generally, such rock pores are tens of nanometers to a few microns in nominal diameter. In certain instances, wide pores of several hundred microns are known. Flexibility of the graphene sheets permits slight deformation under pressure (such as from the drilling fluid) to permit sealing of the graphene sheets around pore edges for preventing or substantially reducing fluid flow into the rock pores.

It will also be apparent to one skilled in the art that the drilling fluids disclosed herein have utility in down-hole operations other than drilling such as those where, for example, it is desirable to prevent fluid from entering rock formations. For example, in hydraulic fracturing operations it is desirable to prevent fluid from entering a fractured rock formation, since the extent of fracture is at least partially determined by the relative rate of crack propagation to the rate of fluid loss by the rock formation. Using the drilling fluids including a graphene during fracturing operations would advantageously extend the ultimate extent of fracturing.

In various embodiments, drilling fluids including a graphene are disclosed. In some embodiments, the graphene composition is present in a concentration range of about 0.0001% to about 10% by volume of the drilling fluid. In other embodiments, the graphene composition is present in a concentration range of about 0.01% to about 0.1% by volume of the drilling fluid. As is demonstrated in the experimental examples hereinbelow, even in such low concentrations, graphene solutions have pore-blocking capabilities. In further embodiments, other additives may be included in the drilling fluid such as, for example, additives to increase the fluid density, if needed.

Drilling fluids are well-known in the art. Non-limiting examples of drilling fluids include, for example, vegetable ester-based drilling fluids (e.g., ACCOLADE® by Baroid); water-based drilling fluids (e.g., BAR-OMEGA® and HYDRO-GUARD® by Baroid); calcium chloride-based drilling fluids (e.g., BRINEDRIL N® by Baroid); and aldehyde-based drilling fluids. The graphene compositions described herein may be added to any of these drilling fluids, or a custom drilling fluid formulation can be prepared. Custom drilling fluid formulations may be prepared in a water- or oil-based liquid. In various embodiments, the drilling fluids may further include a surfactant. For example, a drilling fluid including a graphene may include water, a graphene and an optional surfactant. Surfactants may include, for example, anionic surfactants, cationic surfactants, amphoteric (amphipathic/amphophilic) surfactants, non-ionic surfactants, and combinations thereof. For example, the optional surfactant may be sodium dodecylbenzenesulfonate (SDBS).

Various graphene compositions are suitable for use in the drilling fluids of the present disclosure. In various embodiments, the graphene compositions include, for example, graphene oxide and graphite oxide. In other various embodiments, the graphene compositions include, for example, a chemically-converted graphene. In other various embodiments, the graphene compositions include, for example a functionalized graphene. In some embodiments, the graphene is functionalized with a plurality of aryl groups. In some embodiments, the graphene is chemically-converted and functionalized with a plurality of aryl groups. Graphene sheets in any of the various graphene compositions disclosed herein may range from about several hundred nanometers in width up to about a few tens of microns in width in some embodiments and from about several hundred nanometers up to about 1 mm in width or more in other various embodiments. Advantageously, such widths are typically sufficient for bridging rock pores when the graphenes are used in the drilling fluids disclosed herein.

In various embodiments, the chemically-converted graphene is prepared by a reduction of graphite oxide. In various embodiments, the reduction of graphite oxide is conducted with hydrazine. Alternative reagents suitable for reducing graphite oxide into chemically-converted graphene include, for example, hydroquinone and $NaBH_4$. Production of chemically-converted graphene by hydrazine reduction of graphite oxide is particularly advantageous in producing predominantly individual graphene sheets. Although stable aqueous dispersions of chemically-converted graphenes can be prepared, it is advantageous to utilize chemically-converted graphenes stabilized with a surfactant for further use. For example, in preparing functionalized chemically-converted graphenes, higher concentrations of chemically-converted graphenes that are obtainable using a surfactant are advantageous for maximizing reaction product yields. In the absence of a surfactant, redispersal of chemically-converted graphenes can sometimes be difficult after work-up and recovery.

Figure 2:
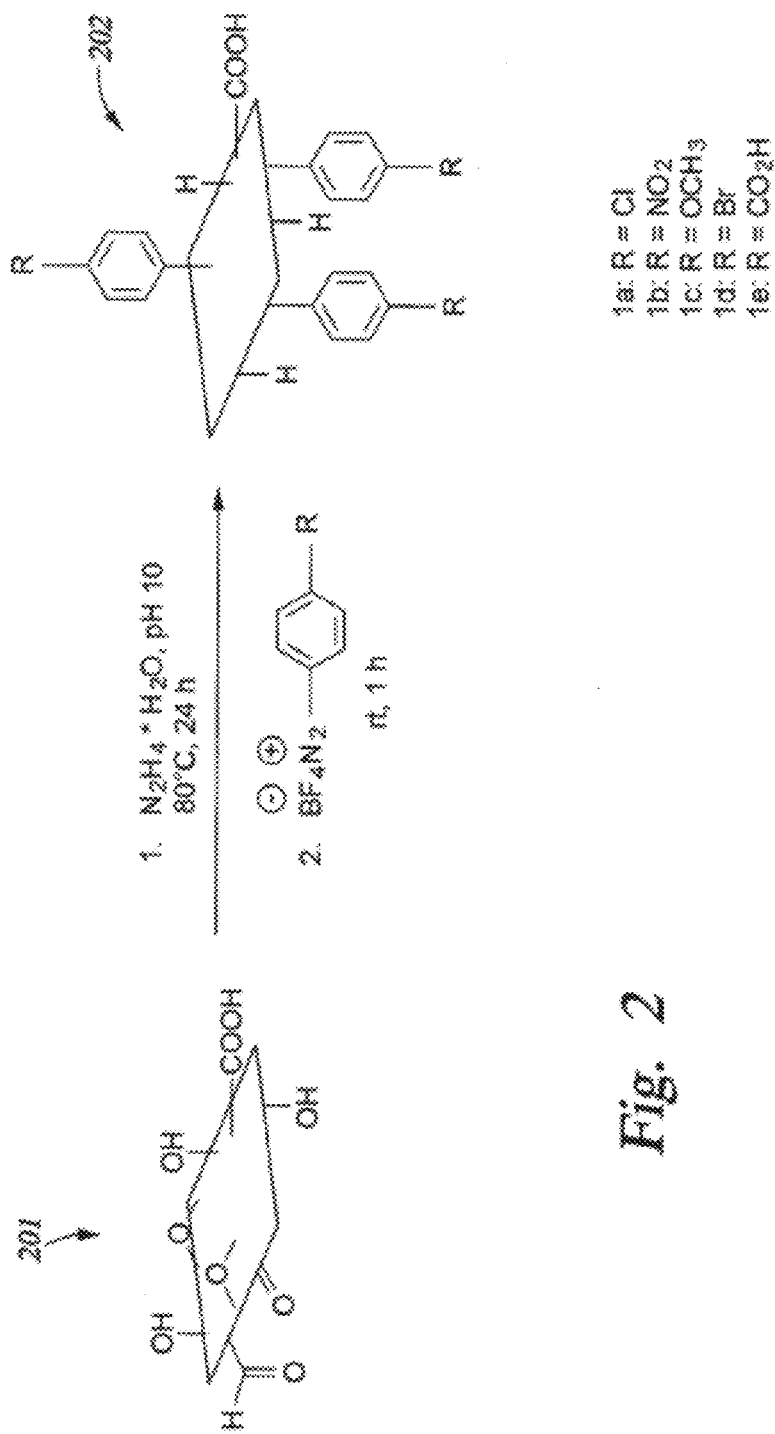
FIG. 2 presents an illustrative synthetic scheme for production of functionalized chemically-converted graphenes.

In various embodiments of the drillings fluids, the graphene may be functionalized with various functional groups bound to carbon (i.e., not to residual carboxy or hydroxyl moieties) on the graphene surface. In various embodiments of the drilling fluids, a chemically-converted graphene is functionalized with a plurality of aryl groups. A particularly facile means for preparing functionalized chemically-converted graphenes is illustrated in FIG. 2. In the illustrative procedure shown in FIG. 2, graphite oxide 201 is reduced with hydrazine to provide a chemically-converted graphene (not shown). The chemically-converted graphene is then reacted in a second step with a diazonium species to provide functionalized chemically-converted graphene 202. For example, as illustrated in FIG. 2, the diazonium species can be a diazonium salt. The functionalized chemically-converted graphenes shown in FIG. 2 are merely illustrative of the functionalized chemically-converted graphenes that can be produced using the methods described herein. Diazonium salts are well known to those of skill in the art, and any diazonium salt or a diazonium salt prepared in situ can be used for functionalizing the chemically-converted graphenes described herein. The wide range of functionalized chemically-converted graphenes accessible by the methods described herein allows modification of solubility and other physical properties of the graphene, which may be advantageous in various embodiments of the drilling fluids. In various embodiments of the drilling fluids, the diazonium salt functionalization produces chemically-converted graphenes functionalized with aryl groups including, for example, p-chlorophenyl (compound 1a), p-nitrophenyl (compound 1b), p-methoxyphenyl (compound 1c), p-bromophenyl (compound 1d), and p-carboxyphenyl (compound 1e) moieties. In various embodiments, the aryl groups have a structure selected from the group consisting of:

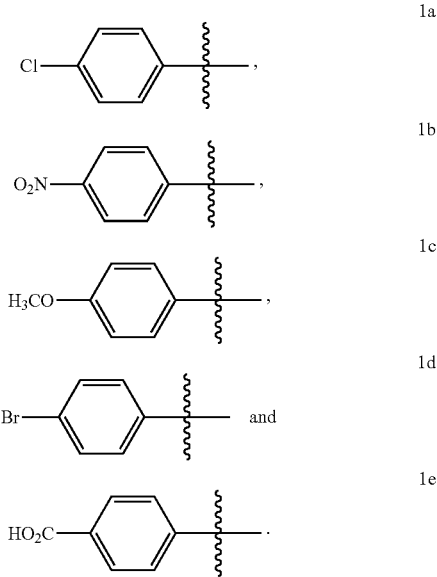

In other various embodiments, the aryl groups include, for example, optional hydroxyl, polyhydroxyl, oligomeric ethylene oxide, or poly(ethylene oxide) pendant groups to enhance water solubility.

In various embodiments, methods for making a drilling fluid including a graphene are disclosed. The methods include providing a graphene, providing a drilling fluid, and dispersing the graphene in the drilling fluid. Dispersion may be accomplished by a number of methods including, for example, stirring, sonicating, or combinations thereof. In various embodiments, the methods include suspending the graphene with a surfactant to facilitate the dispersing step. In some embodiments of the methods, the graphene forms about 0.0001% to about 10% by volume of the drilling fluid. In some embodiments of the methods, the graphene forms about 0.01% to about 0.1% by volume of the drilling fluid.

Various graphenes may be used in the methods for making a drilling fluid. In some embodiments of the methods, the graphene is graphite oxide or graphene oxide. In additional embodiments of the methods, the graphene is a chemically-converted graphene. In other embodiments of the methods, the graphene is functionalized. In further embodiments of the methods, the graphene is functionalized with a plurality of aryl groups. In some embodiments of the methods, the graphene is a chemically-converted graphene that is functionalized with a plurality of aryl groups. In various embodiments, the aryl groups include, for example, p-chlorophenyl, p-nitrophenyl, p-methoxyphenyl, p-bromophenyl and p-carboxyphenyl. In other various embodiments, the aryl groups include, for example, optional hydroxyl, polyhydroxyl, oligomeric ethylene oxide, or poly(ethylene oxide) pendant groups. As discussed hereinabove, an illustrative method for functionalizing graphene sheets involves a reaction of the graphene sheets with a diazonium species. However, diazonium functionalization should not be considered limiting, and other functionalization methods may be used alternatively or in combination with diazonium functionalization. As numerous reactions for functionalizing carbon nanotubes (which are formed from a rolled up graphene sheet) are known, certain carbon nanotube functionalization methods may be adapted by those skilled in the art to accomplish graphene sheet functionalization in a like manner. For example, attachment of hydroxyl or amine groups to the carboxyl groups of graphite oxide or reduced graphite oxide to form esters or amides can be accomplished through well-established esterification and amidation protocols. The esters and amides can include polyhydroxylated or polyaminated functionalities to form water-soluble functionalized graphenes. Such functionalized graphenes reside within the spirit and scope of the present disclosure and may be used in any of the drilling fluid compositions disclosed herein.

In addition to drilling fluids including a graphene, Applicants describe derivatized graphenes and methods for making derivatized graphenes. The derivatized graphenes may be used in the drilling fluids of the present disclosure or utilized for other purposes. In various embodiments, derivatized graphenes are disclosed. The derivatized graphenes are a chemically-converted graphenes. The chemically-converted graphenes are derivatized with a plurality of functional groups. In various embodiments, the chemically-converted graphenes are produced by a reduction of graphite oxide. In some embodiments, the reduction of graphite oxide is conducted with hydrazine. Alternative reagents for reducing graphite oxide to chemically-converted graphene have been considered hereinabove.

Functional groups may include, for example, alkyl groups and aryl groups, each of which may be unsubstituted or substituted with any number of additional atoms other than carbon and hydrogen. For example, additional atoms may include oxygen or nitrogen in polyhydroxylated, polyaminated, or polycarboxylated alkyl and aryl groups. The plurality of functional groups may be introduced, for example, through a reaction of a chemically-converted graphene with a diazonium species. In various embodiments, each of the plurality of functional groups is bound to surface carbon atoms of the chemically-converted graphenes. Diazonium species are particularly advantageous for introducing carbon-bound alkyl and aryl groups. In various embodiments, the diazonium species comprises a diazonium salt. Diazonium salts may be pre-formed and isolated or prepared in situ when too unstable for isolation. Aryl diazonium salts are known in the art to be particularly stable and tolerant of a wide range of functionality. In various embodiments, the functional groups include aryl moieties, which are derived from aryl diazonium salts. In various embodiments, the aryl moieties include, for example, p-chlorophenyl, p-nitrophenyl, p-methoxyphenyl, p-bromophenyl and p-carboxyphenyl moieties.

Methods for preparing derivatized graphenes are also disclosed herein. The methods for preparing derivatized graphenes include providing a chemically-converted graphene and derivatizing the chemically-converted graphene with a plurality of functional groups. Functional groups, as described hereinabove, include alkyl and aryl groups, for example. Methods for preparing derivatized graphenes include, for example, a conversion of graphite to graphite oxide through treatment with an oxidant, followed by a reduction of the graphite oxide to produce a chemically-converted graphene. In various embodiments, the reduction of graphite oxide is conducted with hydrazine. As discussed hereinabove, other oxidants may be used for reducing graphite oxide such as, for example, hydroquinoine and $NaBH_4$.

In various embodiments, methods for preparing a chemically-converted graphene also include suspending the chemically-converted graphene in a surfactant. Surfactant suspension may occur during or after synthesis of the chemically-converted graphene. For example, graphite oxide may include a surfactant that eventually forms a stabilized solution of chemically-converted graphene as the graphite oxide is reduced. In other embodiments, the chemically-converted graphene is formed without a surfactant and is redispersed with a surfactant after synthesis. As demonstrated in the experimental examples hereinbelow, surfactant-stabilized chemically-converted graphenes and chemically-converted graphenes (no surfactant) demonstrate comparable reactivity toward further functionalization to provide derivatized graphenes, although the former chemically-converted graphenes have more beneficial solubility properties. In various embodiments, the surfactant for solubilizing the chemically-converted graphenes includes SDBS.

Scheme 2 illustrates an embodiment whereby aryl-functionalized chemically-converted graphenes may be produced by a reaction of chemically-converted graphenes with a diazonium salt. In various embodiments, the derivatizing step for forming derivatized graphenes includes a reaction with a diazonium species. In various embodiments, the diazonium species includes a diazonium salt. In various embodiments of the derivatized graphenes, the functional groups include aryl moieties, which are introduced by the diazonium species. The aryl moieties include, for example, p-chlorophenyl, p-nitrophenyl, p-methoxyphenyl, p-bromophenyl and p-carboxyphenyl moieties. Each of the corresponding diazonium salts are readily produced and isolated for use in introducing the aryl groups on to the surface of the chemically-converted graphenes. Without being bound by theory or mechanism, present understanding of the reaction process includes decomposition of the diazonium species into a radical species, which is reactive toward the graphene sheets. Like radical-based reaction processes for preparing derivatized graphenes may envisioned by those skilled in the art.

Various methods may be used for the preparation of graphite oxide. Conventional preparations of graphite oxide typically involve oxidation of graphite by the Staudenmaier procedure. (L. Staudenmaier, *Ber. Dtsch. Chem. Ges,* 1898, 31, pp. 1481-1489). For example, the Staudenmaier procedure includes the oxidation of a dispersion of graphite in $H_2SO_4$/ fuming $HNO_3$ by $KClO_3$. Applicants describe hereinbelow an alternative preparation of graphite oxide comprising a reaction conducted in commercial bleach solution. Additional methods may be envisioned by persons of ordinary skill in the art. Without being bound by theory or mechanism, current understanding is that that the oxidation of graphite to graphite oxide can allow individual sheets of exfoliated graphene to be produced. The graphite oxide is readily dispersable in water due to the presence of hydrophilic oxygen functionalities on the edges and basal planes of the graphene sheets. Variation in the types and frequency distribution of oxygen functionalities introduced on to the graphite oxide surface is dependent on the oxidation method used. Oxygen functionalities include, for example, carboxy groups, hydroxyl groups, epoxide groups and aldehdye groups.

Various methods may be used for the preparation of graphite oxide. Conventional preparations of graphite oxide typically involve oxidation of graphite by the Staudenmaier procedure, as disclosed in L. Staudenmaier, Ber. Dtsch. Chem. Ges, 1898, 31, pp. 1481-1489. The entirety of this article is incorporated herein by reference. For example, the Staudenmaier procedure includes the oxidation of a dispersion of graphite in $H_2SO_4$/fuming $HNO_3$ by $KClO_3$. Applicants describe hereinbelow an alternative preparation of graphite oxide comprising a reaction conducted in commercial bleach solution. Additional methods may be envisioned by persons of ordinary skill in the art. Without being bound by theory or mechanism, current understanding is that that the oxidation of graphite to graphite oxide can allow individual sheets of exfoliated graphene to be produced. The graphite oxide is readily dispersable in water due to the presence of hydrophilic oxygen functionalities on the edges and basal planes of the graphene sheets. Variation in the types and frequency distribution of oxygen functionalities introduced on to the graphite oxide surface is dependent on the oxidation method used. Oxygen functionalities include, for example, carboxy groups, hydroxyl groups, epoxide groups and aldehdye groups.

In various embodiments, the methods for preparing graphite oxide also include acidifying the supernatant phase to provide an acidified supernatant phase and evaporating the acidified supernatant phase to provide a crude graphite oxide. As the oxidation is conducted under basic conditions, carboxyl moieties produced on the surface of the graphite oxide are their deprotonated carboxylate state. The acidification step converts the carboxylate moieties into protonated carboxyl moieties and results in precipitation of salt. The salt is sodium chloride when hydrochloric acid is utilized for the acidification step. The acidified supernatant phase contains fully protonated, graphite oxide in a crude form. Evaporating the acidified supernatant phase provides a solid crude graphite oxide, which is sufficiently pure for many purposes. The methods for preparing graphite oxide further include purification steps to produce a purified graphite oxide. The methods further include dissolving the crude graphite oxide in water to provide a crude graphite oxide solution, dialyzing the crude graphite oxide solution to provide a purified graphite oxide solution, and evaporating the purified graphite oxide solution to provide a purified graphite oxide as a solid. The purification steps include, for example, removal of residual salt from the crude graphite oxide during the dialyzing step. The primary purpose of the dialyzing step is for cases where analytically-pure samples are desired for analysis. For work on bulk solutions and in the methods described herein, the dialyzing step is not particularly critical.

EXPERIMENTAL EXAMPLES

The following experimental examples are included to demonstrate particular aspects of the present disclosure. It should be appreciated by those of skill in the art that the methods described in the examples that follow merely represent exemplary embodiments of the disclosure. Those of skill in the art should, in light of the present disclosure, appreciate that many changes can be made in the specific embodiments described and still obtain a like or similar result without departing from the spirit and scope of the present disclosure.

Example 1

Synthesis of Graphite Oxide

Graphite oxide was synthesized from expanded graphite (SupraCarbonic LLC, Costa Mesa, Calif.) using the Staudenmaier procedure. Briefly, 5 g (416.7 mmol C) of expanded graphite was added in five portions to a stirred mixture of concentrated $H_2SO_4$ (87.5 mL) and fuming $HNO_3$ (45 mL) cooled in an ice-water bath. To the mixture was added $KClO_3$ (55 g) in five separate portions over a period of 15 minutes with sufficient venting using nitrogen gas to reduce the risk of explosion from generated of chlorine dioxide gas. [CAUTION: personal protective equipment including a face shield, acid resistant gloves and blast shield should be used at all times.] The resulting slurry was stirred at room temperature for 96 hours. The green slurry was poured into 4 L of ice water, and the mixture was filtered and subsequently washed with 5 L of 5% HCl. The filter cake was then rinsed thoroughly with water until the filtrate became neutral. Thereafter, the filter cake was rinsed with methanol and diethyl ether to provide 4.1 g of graphite oxide as a fine brown powder.

Example 2

Alternative Synthesis of Graphene Oxide

Carbon black (CABOT STERLING® NS, Cabot Corporation) was suspended in a mixture of NaClO (commercial bleach, 150 mL), $NaHCO_3$ (10 g), and water (100 mL). The mixture was heated at low boiling for 4 hours with stirring. Additional water was added periodically to compensate for water lost through evaporation. The total volume was maintained between 150 to 250 mL throughout the heating period. The mixture was cooled to room temperature, and unreacted carbon black was removed by centrifugation. The resulting supernatant was filtered through a 0.2 μm membrane and stored. The recovered carbon black was subjected to the same treatment 6 more times, and all filtrates were combined together. The combined filtrates were acidified to pH 2 with HCl, and the acidified filtrate was evaporated to 250 mL and cooled to room temperature. Precipitated NaCl was removed by filtration on a glass frit, washed twice with 50 mL of 20% HCl and then discarded. The combined filtrate after acid washing was evaporated to dryness to provide a brown solid of crude graphite oxide. The crude graphite oxide was dissolved in 100 mL water and dialyzed for 7 days. Evaporation of the dialysate provided 240 mg of purified graphite oxide as a brown powder of nanoplatelets.

Example 3

Preparation of Chemically-Converted Graphene from Graphite Oxide

Graphite oxide (225 mg) was dispersed in 1 wt % aqueous sodium dodecylbenzenesulfonate (SDBS) surfactant (225 mL) and homogenized for 1 hour using a Dremel tool (400 xpr) fitted with a standard-capacity rotor-stator generator (Cole-Parmer A-36904-52). Homogenization was followed by cup horn sonication (Cole-Parmer Ultrasonic Processor Model CP 750) at 80% power for 10 minutes. The pH was adjusted to 10, as measured using pH paper, using aqueous 1 M aqueous NaOH. The resulting graphite oxide dispersion was reduced with 60% hydrazine hydrate (2.25 mL, 72.23 mmol) at 80° C. for 24 hours. The reaction mixture was filtered through glass wool to remove large aggregates and to provide a surfactant-stabilized, chemically-converted graphene dispersion decant with a typical concentration of about 1 mg/mL.

Example 4

Alternative Synthesis of Chemically-Converted Graphene

A solution of graphite oxide nanoplatelets (prepared as described in Example 2) was prepared from 50 mg graphite oxide and 100 mL $H_2O$ in a 100 mL Erlenmeyer flask. Ammonium hydroxide solution (1 M, 0.1 mL) and hydrazine hydrate (60%, 0.1 mL) were added to the flask, and the reaction mixture was heated for 1 hour using a boiling water bath. The reaction mixture was cooled to room temperature and then dialyzed against deionized water using a dialysis membrane with a 1000 Dalton cutoff. The dialysate was evaporated in vacuo to provide 33 mg of chemically-converted graphene as black-brown, shiny flakes.

Example 5

Diazonium Functionalization of Chemically-Converted Graphene

A typical procedure for functionalizing chemically-converted graphenes is illustrated in FIG. 2. In a typical functionalization procedure, 20 mL of a surfactant-stabilized, chemically-converted graphene dispersion (see Example 3) was reacted with a diazonium salt (0.33 mmol diazonium salt/mL of surfactant-stabilized, chemically-converted graphene dispersion) for 1 hour at room temperature. The mixture was then diluted with 100 mL of acetone and filtered through a 0.45 μm PTFE membrane. The filter cake was washed three times with water and acetone. The filter cake was thereafter resuspended in DMF to remove SDBS and residual diazonium salt. The residue was collected by filtration, and the filter cake was copiously washed with acetone. The resulting solid was dried in a vacuum oven overnight at 70° C. to provide 22-24 mg of functionalized chemically-converted graphene.

Example 6

Figure 3:
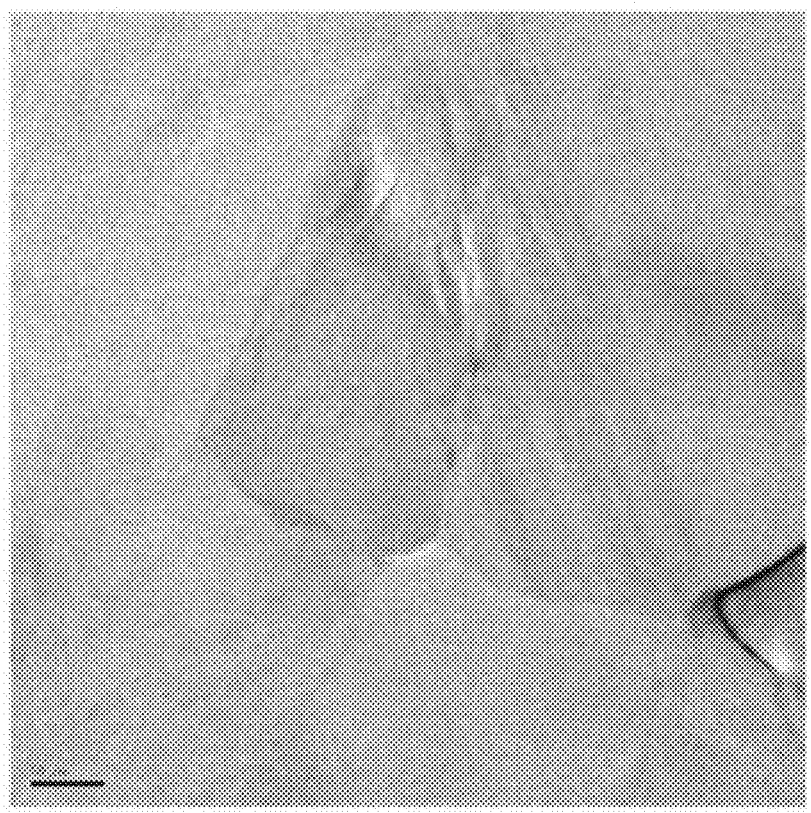
FIG. 3 presents a Cryo-TEM image of a surfactant-stabilized chemically-converted graphene (scale bar=50 nm)
Figure 4A:
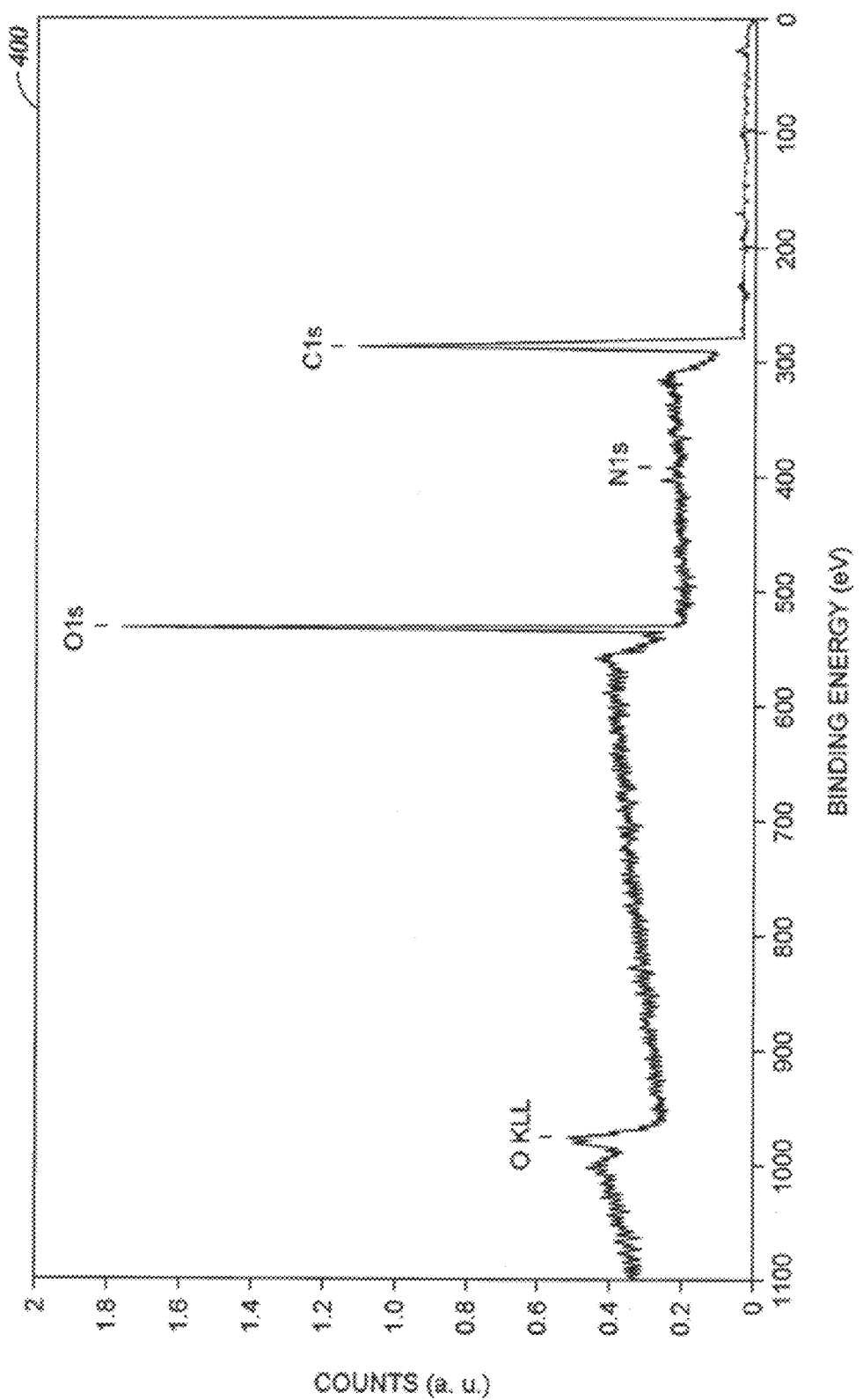
FIG. 4 presents XPS survey scans for graphite oxide, chemically-converted graphene, functionalized chemically-converted graphene 1a, functionalized chemically-converted graphene 1d and a high resolution XPS C1s scan of graphite oxide and surfactant-stabilized chemically-converted graphene.
Figure 4B:
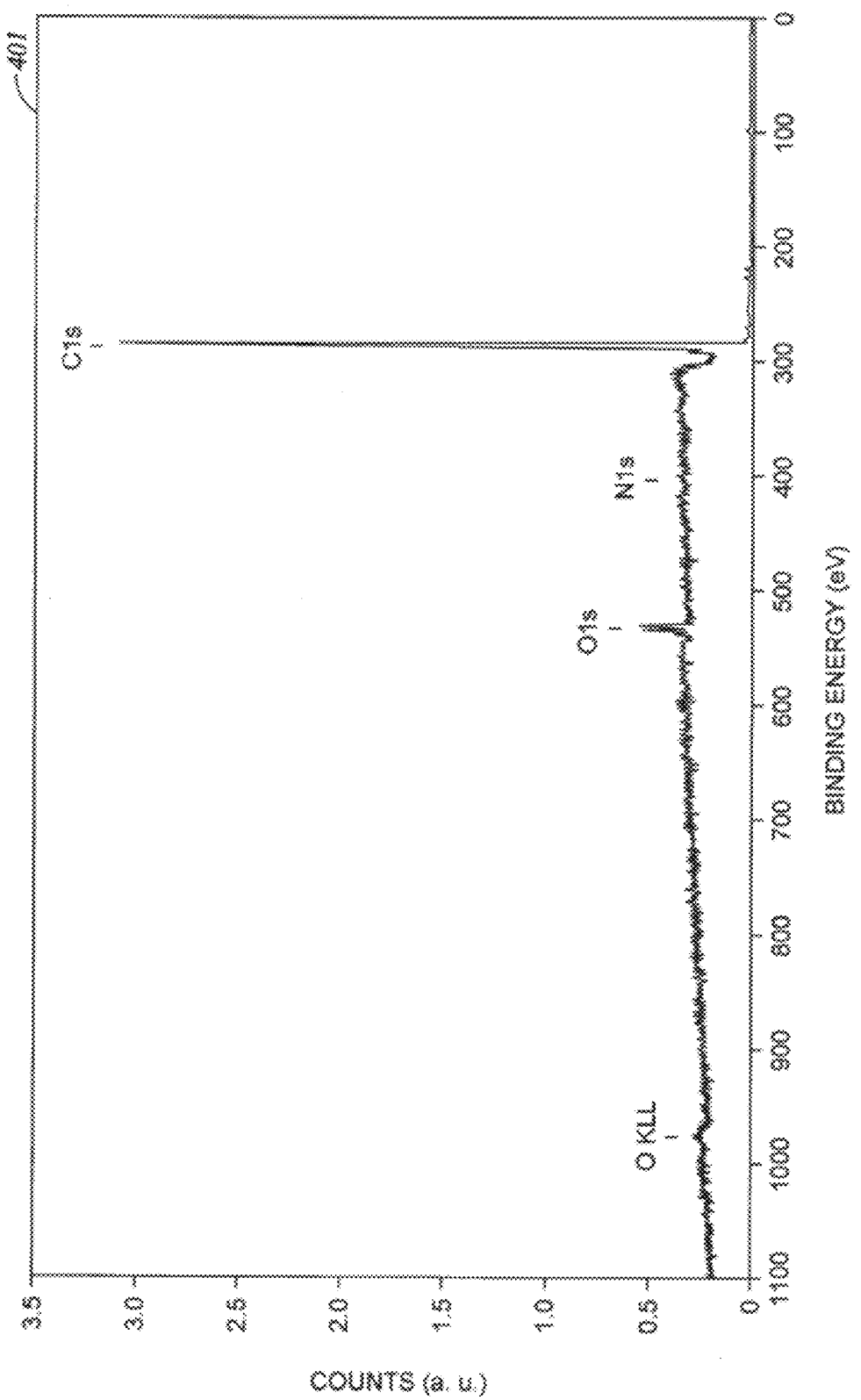
Figure 4C:
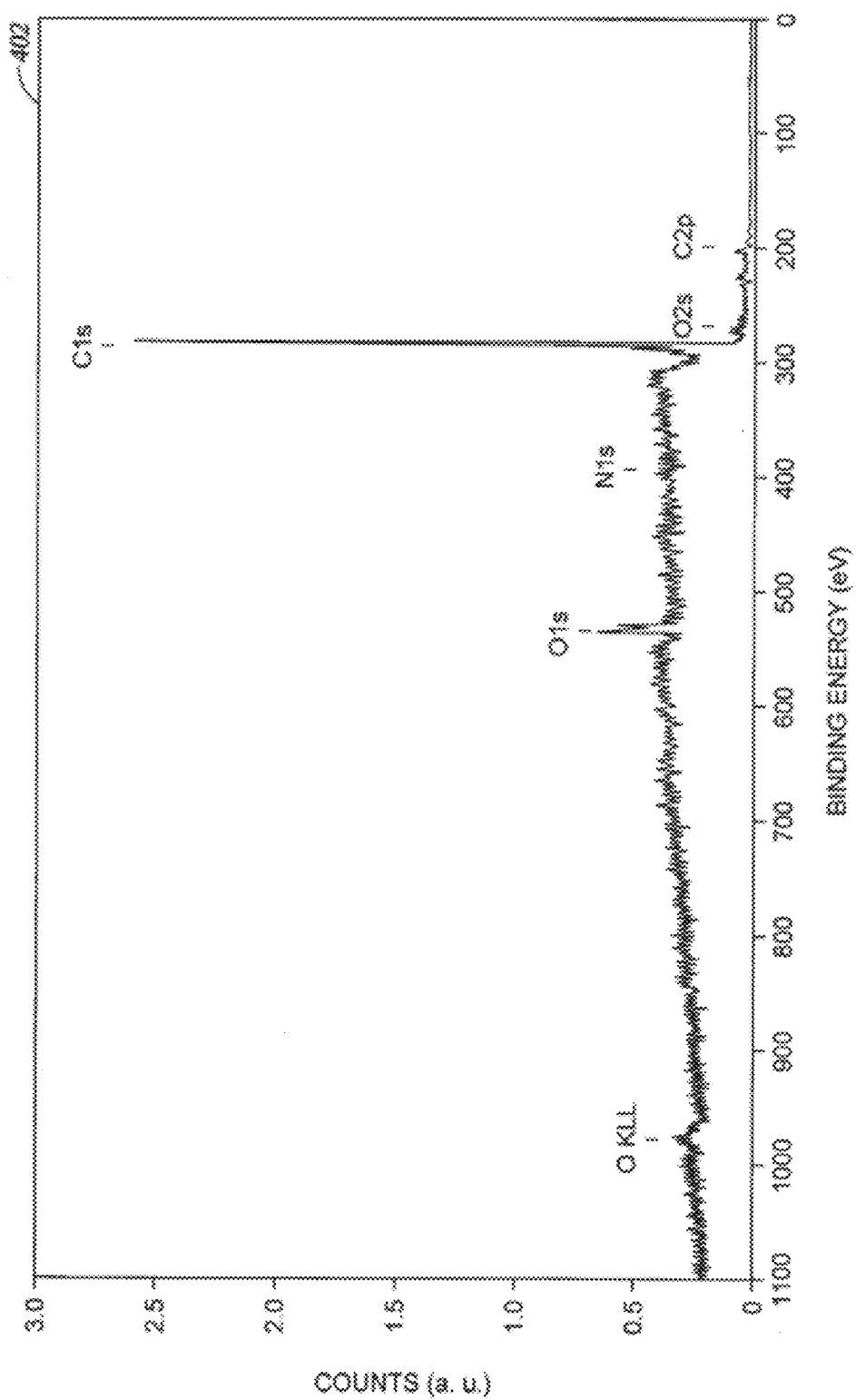
Figure 4D:
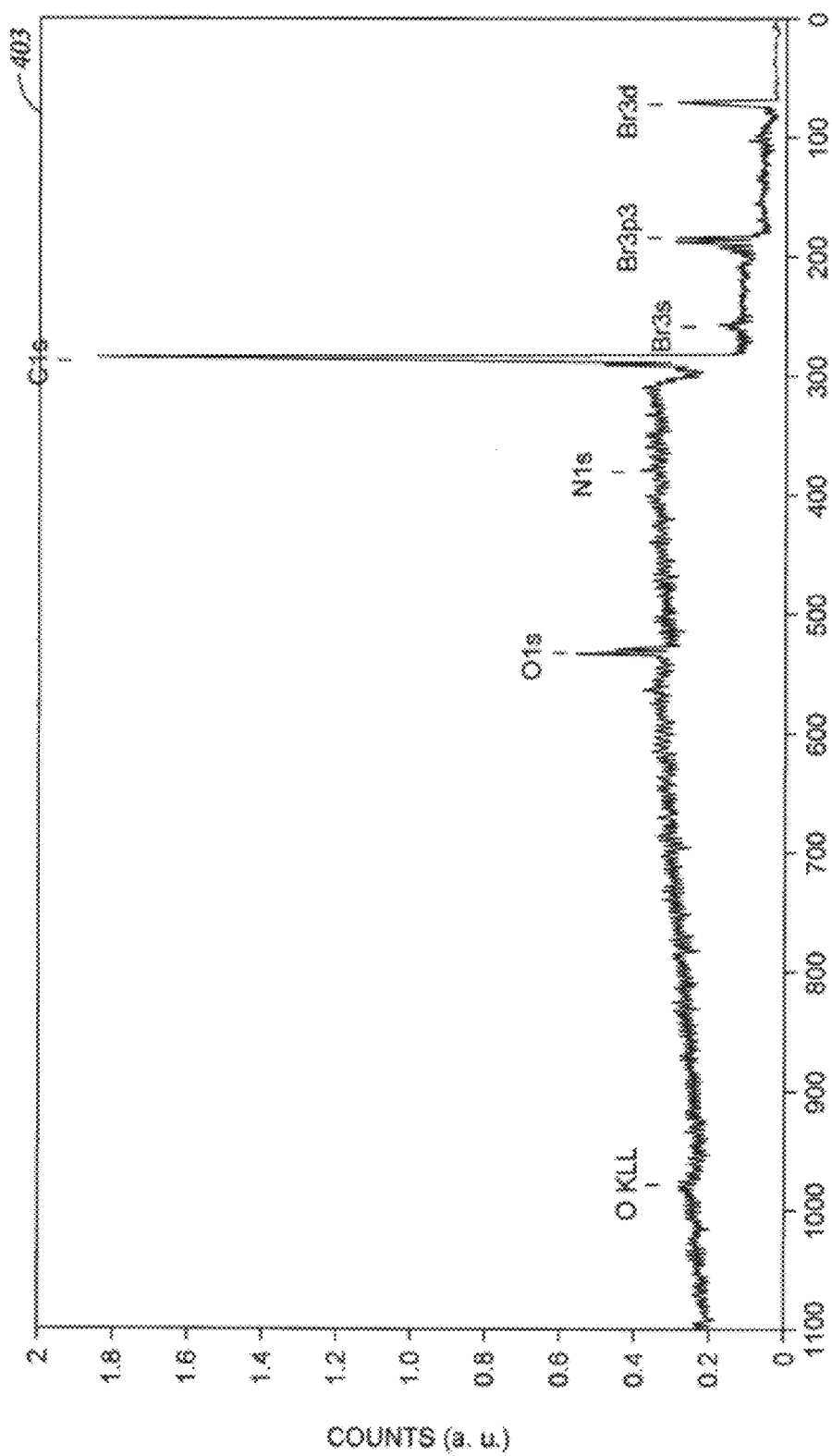
Figure 4E:
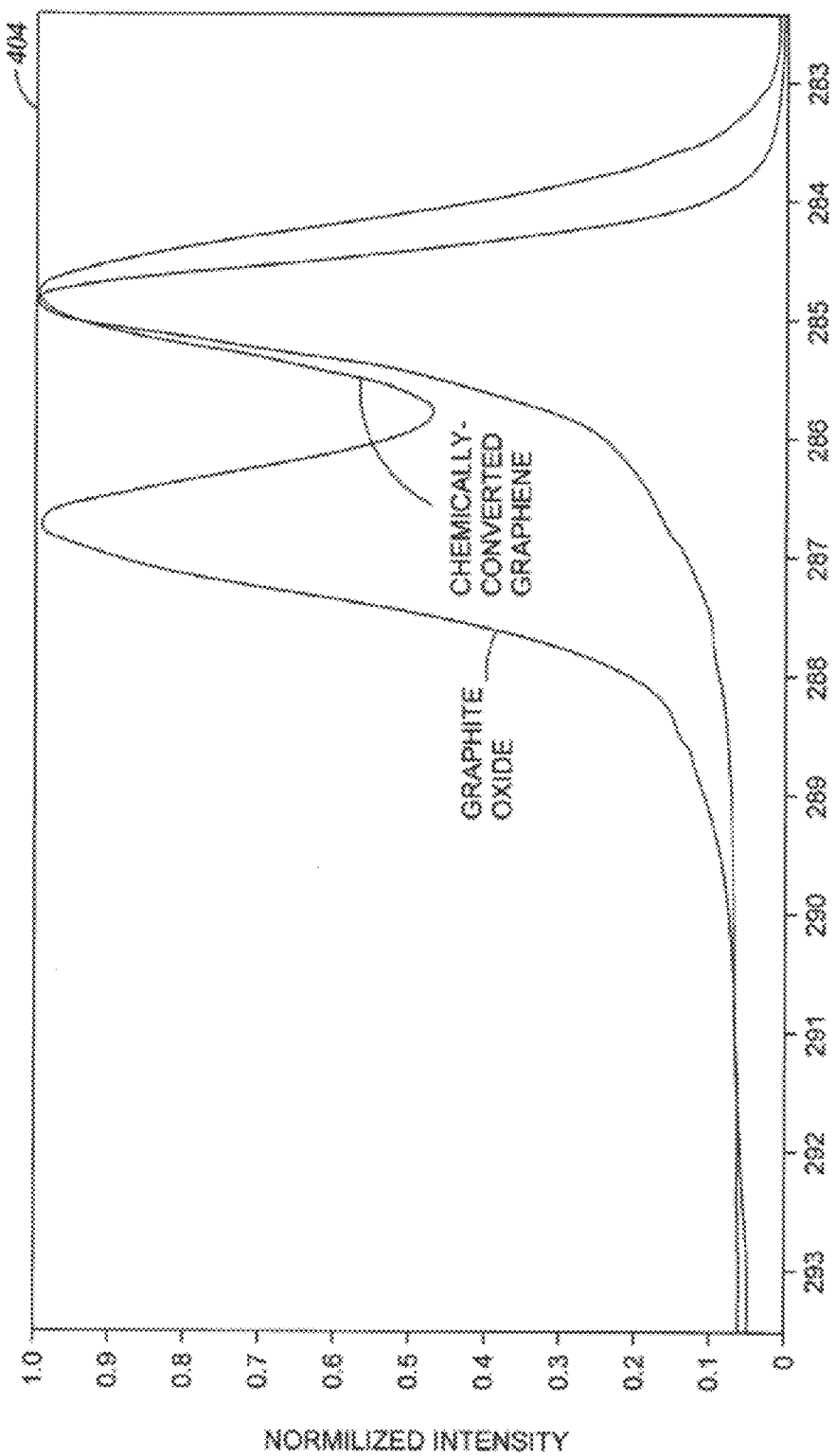

Characterization of Chemically-Converted Graphene and Functionalized Chemically-Converted Graphenes Prior to functionalization, surfactant-stabilized chemically-converted graphene solutions were analyzed by cryogenic transmission electron microscopy (Cryo-TEM) to establish the existence of individual graphene sheets. As the Cryo-TEM images shown in FIG. 3 illustrate, predominantly individual graphene sheets and a few multiple sheet structures were obtained. Aqueous chemically-converted graphene solutions prepared without SDBS surfactant were also prepared, and the chemically-converted graphene material was found to be comparable in analysis and reactivity to that prepared in the presence of SDBS. Use of the surfactant-stabilized, chemically-converted graphene solutions is advantageous for diazonium functionalization, since a more concentrated chemically-converted graphene solution is attainable than for strictly aqueous chemically-converted graphene (1 mg/mL versus 0.25 mg/mL based on graphite oxide weight).

Hydrazine reduction of graphite oxide to produce chemically-converted graphene removed a majority of oxygen functionalities as verified using X-ray photoelectron spectroscopy (XPS). XPS was carried out on a PHI Quantera SXM Scanning X-ray Microprobe with a base pressure of $5 \times 10^{-9}$ Torr, with Al cathode as X-ray source set at 100 W and a pass energy of 140.00 eV (survey scan) or 26.00 eV (high resolution scan), 45° takeoff angle and a 100 μm beam size. As is shown in FIG. 4, the C1s spectrum of chemically-converted graphene 401 showed significantly decreased signals at 286-288 eV compared to that of graphite oxide 400. Overlay XPS spectrum 404 particularly illustrates the loss of signal intensity observed for chemically-converted graphene compared to graphite oxide in this region. The decreased signal intensity is indicative of loss of C—O and C=O functionalities. Surface oxygen groups in graphite oxide were estimated to be about 32%, with a small amount of nitrogen also present (0.4%). After treatment with hydrazine to produce chemically-converted graphene, the percentage of oxygen decreased to 8.7%, and the nitrogen percentage increased to 1.4%. The marginal increase in nitrogen content can be attributed to a small amount of hydrazone formation.

The Raman spectrum of bulk chemically-converted graphene 501 using 514 nm laser excitation showed a similar profile to that of graphite oxide 500. In Raman spectra 500 and 501, the diamondoid (D) to graphitic (G) carbon ratio was close to 1, confirming an incomplete recovery of the graphene structure. Similar behavior was observed for thermally reduced graphene. The 2D peak at ~2700 $cm^{-1}$ was more pronounced in chemically-converted graphene Raman spectrum 501 compared to the parent graphite oxide Raman spectrum 500. This behavior is indicative of an $sp^2$ network present within the graphene sheets.

Referring again to FIG. 4, XPS spectra are shown for functionalized chemically-converted graphenes 1a (p-chlorophenyl) 402 and 1d (p-bromophenyl) 403. Upon treatment with diazonium salts, significant percentages of halogen markers (Cl in 402 and Br in 403) were detected with very little accompanying nitrogen in the functionalized chemically-converted graphenes. This finding indicates that the graphene surface was successfully functionalized with aryl groups. High resolution XPS of 1a and 1d gave the following atomic percentages of halogens: (1a) 4.6% Cl and (1d) 3.2% Br with ~1% N. A control experiment wherein chlorobenzene was added to the surfactant-stabilized, chemically-converted graphene dispersion, followed by work-up and XPS analysis (not shown) ruled out the possibility of physisorption and intercalation between the graphene sheets as the source of chlorinated materials. XPS analysis of the control experiment showed no Cl peak at 200 eV, which is indicative of covalent functionalization in the chemically-converted graphene after reaction with the diazonium salt. Furthermore, graphite oxide (no hydrazine reduction to a chemically-converted graphene) was non-reactive toward diazonium salts under the reaction conditions described hereinabove. For example, attempts to synthesize 1d from graphite oxide showed no Br peak in the XPS spectrum after work-up. Without being bound by theory or mechanism, current understanding of the diazonium functionalization supports a partial re-aromatization in the chemically-converted graphene following hydrazine reduction. The partial re-aromatization provides a surface suitable for functional group introduction using a diazonium species.

Figure 5:
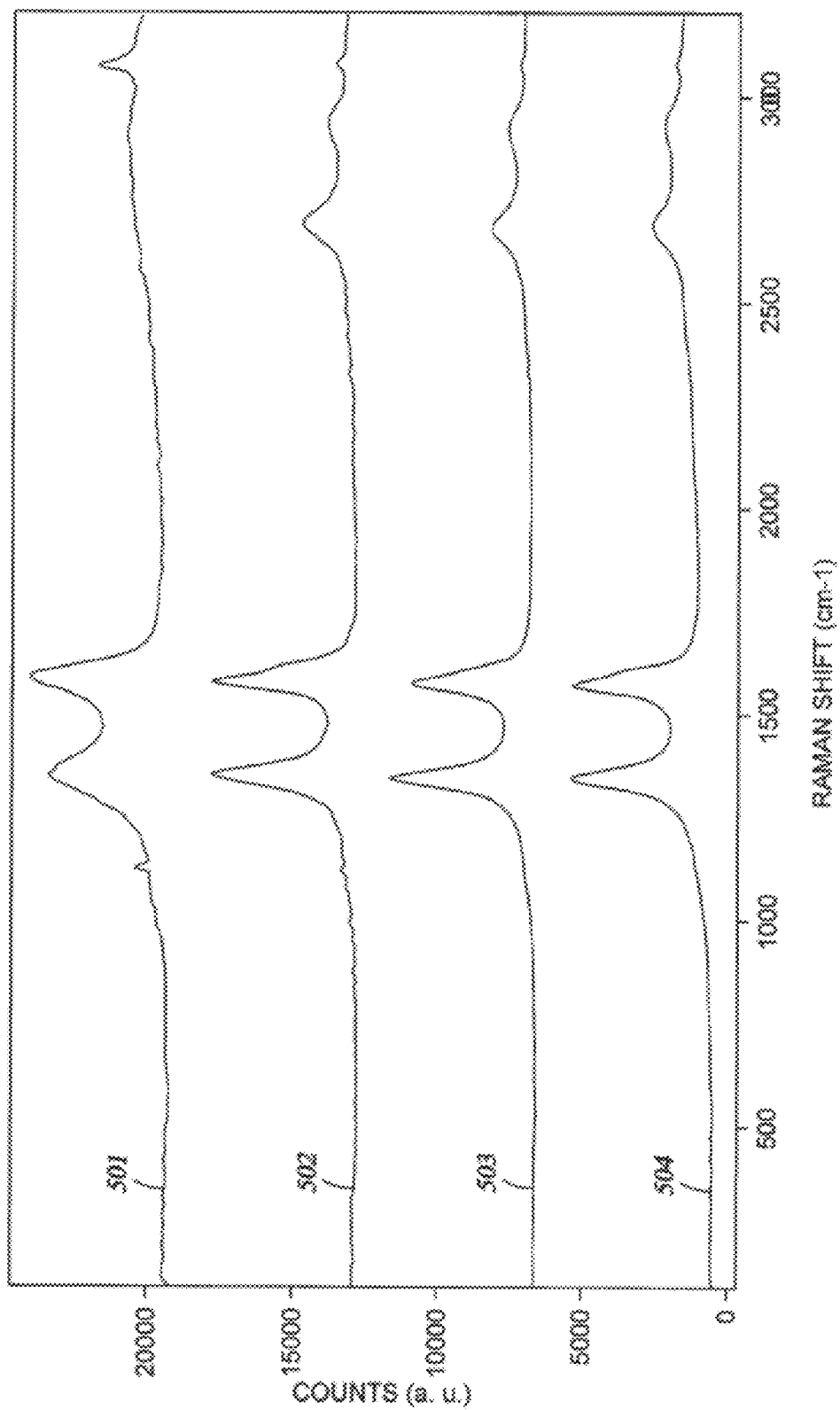
FIG. 5 presents Raman spectra of graphite oxide, surfactant-stabilized chemically-converted graphene, functionalized chemically-converted graphene 1a and functionalized chemically-converted graphene 1a after heating under Ar to 850° C.

Referring again to FIG. 5, functionalized chemically-converted graphene 1b 503 provided D to G ratios similar to those observed for surfactant-stabilized, chemically-converted graphene 502. As a result, gauging the degree of functionalization was difficult to determine using Raman spectroscopy. Functionalized chemically-converted graphene 1b samples heated in a thermogravimetric analysis (TGA) instrument to 850° C. under argon showed some decrease in the intensity of the diamondoid peak in Raman spectrum 504, which is consistent with functionalization. Edge defects are possibly responsible for the minimal change in the D to G ratios upon functionalization.

Figure 6:
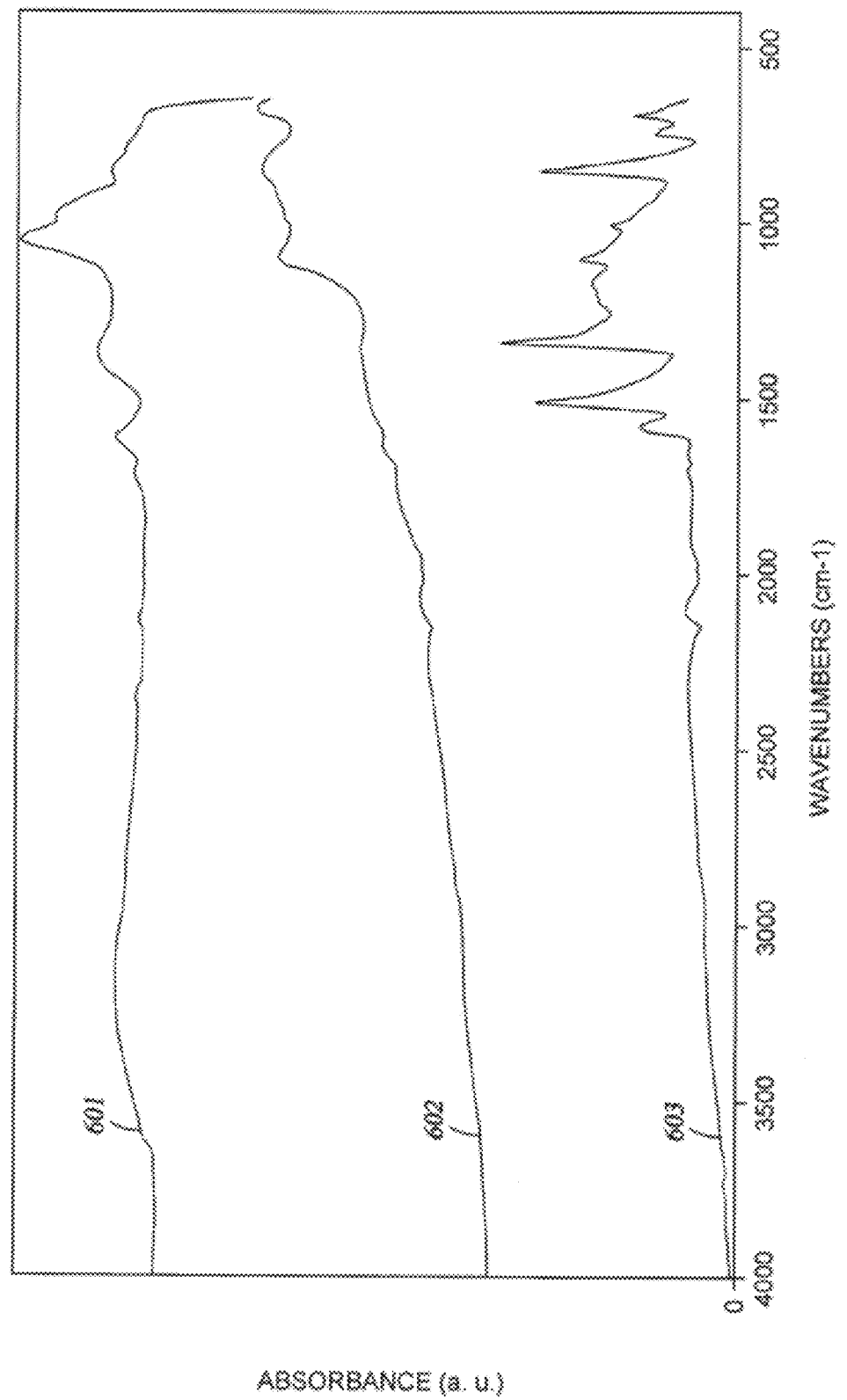
FIG. 6 presents ATR-IR spectra of graphite oxide, surfactant-stabilized chemically-converted graphene and functionalized chemically-converted graphene 1b.

FIG. 6 presents attenuated total reflectance infrared (ATR-IR) measurements for graphite oxide 601, surfactant-stabilized, chemically-converted graphene 602, and functionalized chemically-converted graphene 1b 603. Graphite oxide ATR-IR spectrum 601 showed a C—O stretch at ~1200 cm$^{-1}$ and O—H stretch at 3500-3300 cm$^{-1}$, as well as a C=O stretch at 1720-1690 cm$^{-1}$. The surfactant-stabilized, chemically-converted graphene ATR-IR spectrum 602 was devoid of informative signals and resembled that of bulk graphite. Functionalized chemically-converted graphene ATR-IR spectrum 1b 603 showed asymmetric and symmetric stretches at 1513 cm$^{-1}$ and 1343 cm$^{-1}$, which are attributed to an NO$_2$ group. A C—N stretch at 852 cm$^{-1}$ and an aromatic stretch at 1586 cm$^{-1}$ indicated the presence of p-nitrophenyl moieties attached to the functionalized chemically-converted graphene sheets. The presence of nitrogen was further confirmed by XPS (not shown) showing a strong signal at 406 eV. The absence of azo groups in the 1400-1500 cm$^{-1}$ region in the ATR-IR spectra of the halogen-containing functionalized chemically-converted graphenes supports a mechanism implicating a radical process operating during functionalization with diazonium salts.

Figure 7:
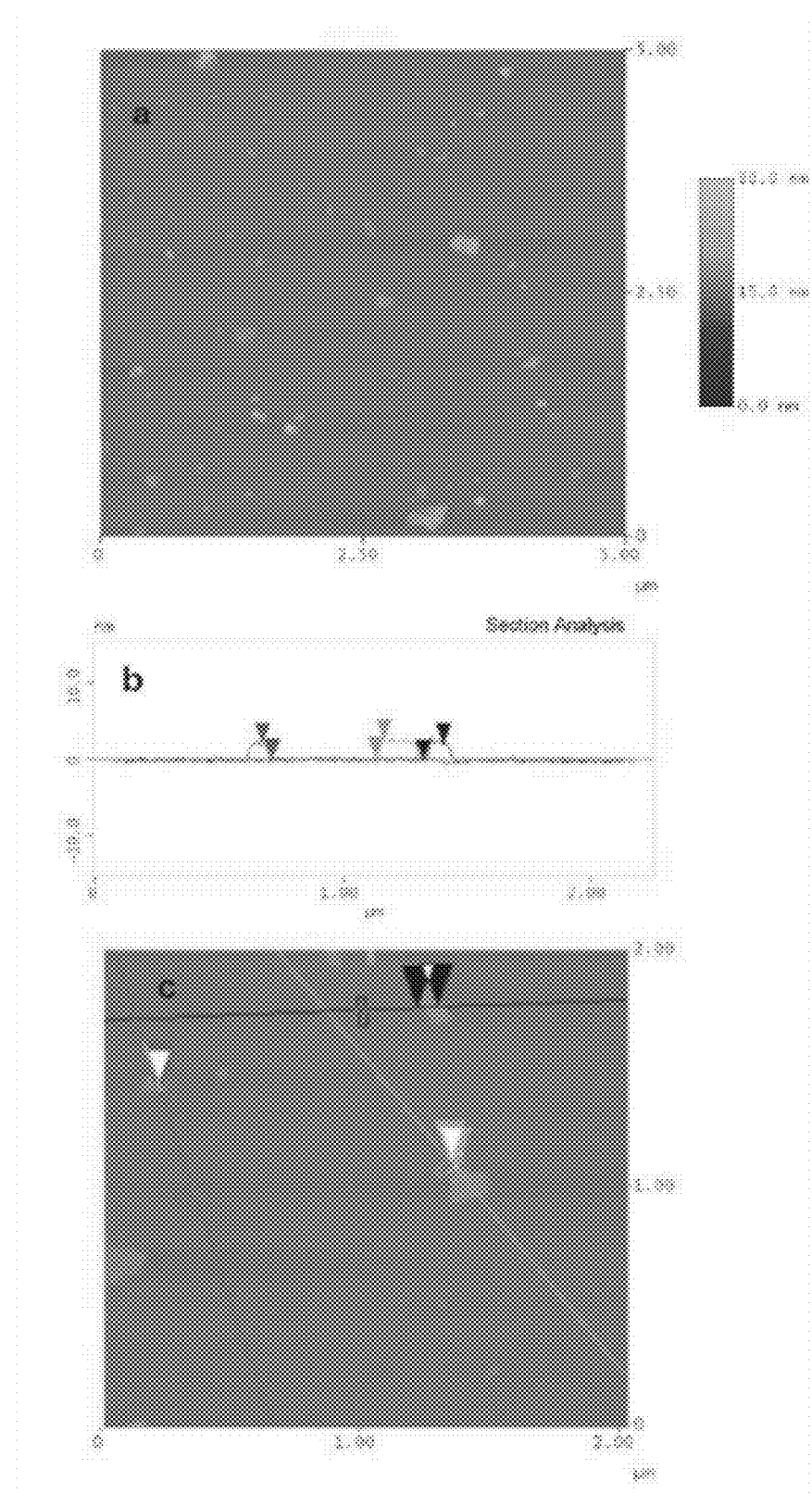
FIG. 7 presents atomic force micrographs of functionalized chemically-converted graphene 1b spin coated on to a freshly cleaved mica surface.

Individual functionalized chemically-converted graphene sheets were imaged using tapping mode AFM. FIG. 7 presents AFM images of functionalized chemically-converted graphene sheets spin-coated on to a mica surface using a 0.1 mg/mL dispersion of 1b in DMF. The theoretical thickness for a graphene sheet functionalized with aryl groups on both sides is about 2.2 nm. The theoretical height measurement assumes that a bare graphene sheet is about 1 nm in thickness, with substituted aromatic groups contributing about 0.6 nm in thickness on each side of the graphene sheet. As measured in the AFM images shown in FIG. 7, the functionalized chemically-converted graphene sheets were about 1.8 nm to about 2.2 nm in thickness. The functionalized chemically-converted graphenes described herein may include single layers or bilayers of graphene sheets.

Figure 8:
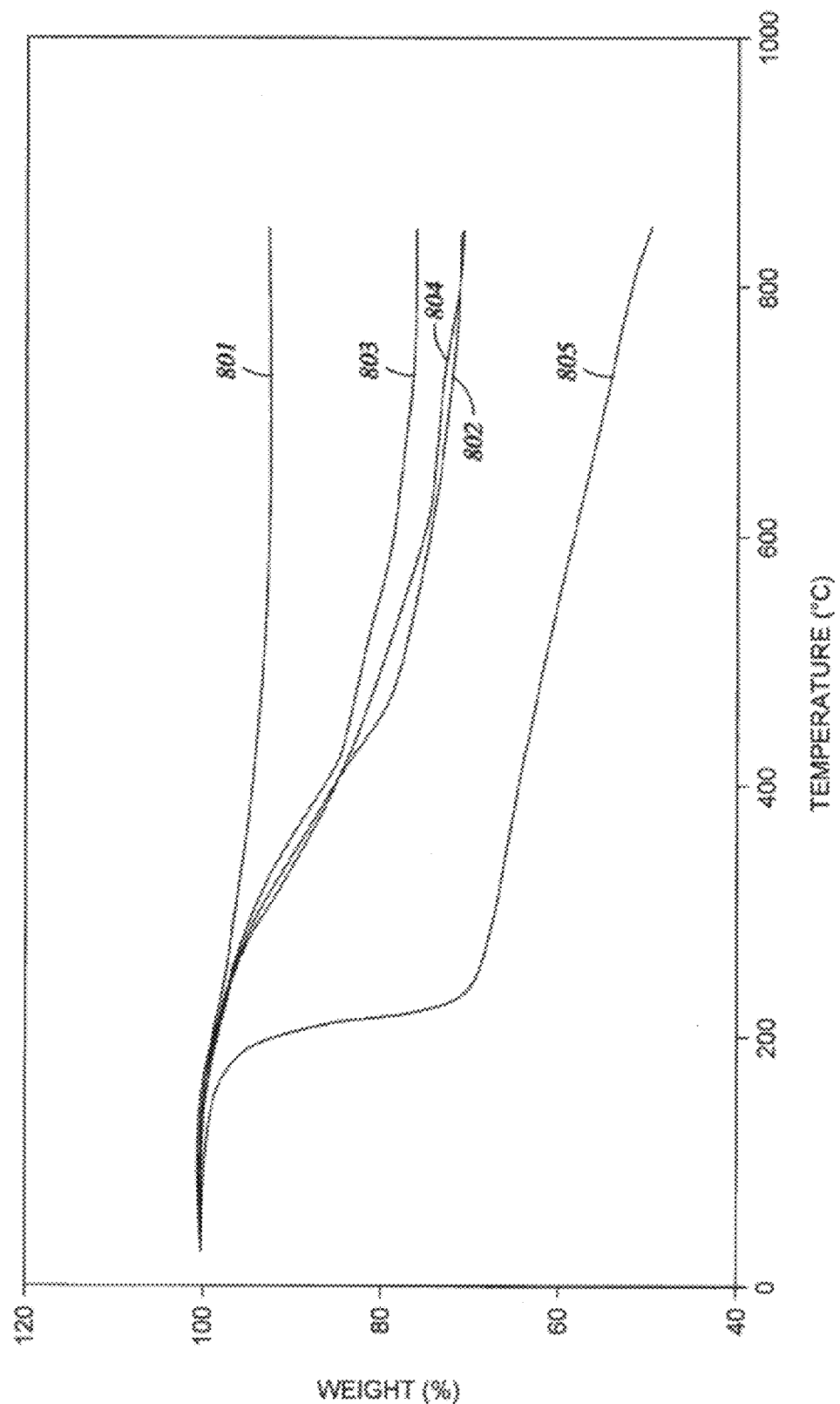
FIG. 8 presents TGA thermograms of graphite oxide, chemically-converted graphene and functionalized chemically-converted graphenes 1a, 1b, and 1c.

Thermogravimetic analysis (TGA) results for graphite oxide 805, surfactant-stabilized, chemically-converted graphene 801, and functionalized chemically-converted graphenes 1a (802), 1b (803), and 1c (804) are presented in FIG. 8. For the TGA results presented in FIG. 8, functional groups were removed by heating the samples under an argon atmosphere to 850° C. at a rate of 10° C./min. The TGA for graphite oxide 805 showed a weight loss of about 50%. The TGA for surfactant-stabilized, chemically-converted graphene 801 showed a weight loss of about 7.4%, which is attributable to carboxyl groups on the chemically-converted graphene not affected by hydrazine reduction, as well as the incomplete re-aromatization discussed hereinabove. TGA samples for functionalized chemically-converted graphenes 1a-1d demonstrated weight losses as follows: (1a) 29%, (1b) 24%, (1c) 29%, and (1d) 31%. Based on the TGA weight loss results, the degree of chemically-converted graphene functionalization was estimated to be about one aryl group functionality for about every 55 graphene carbons.

Example 7

Solubility of Functionalized Chemically-Converted Graphenes

Functionalized chemically-converted graphenes 1a-1d were readily dispersed in N,N'-dimethylformamide (DMF), N,N'-dimethylacetamide (DMAc) and 1-methyl-2-pyrrolidinone (NMP) at concentrations up to 1 mg/mL with minimal sedimentation. To further illustrate the improved solubility of functionalized chemically-converted graphenes in DMF, 3 mg of surfactant-stabilized, chemically-converted graphene and functionalized chemically-converted graphenes 1a-1d were dispersed in 3 mL DMF using an ultrasonic cleaner (Cole-Parmer Model 08849-00) for 5 minutes, followed by centrifugation in an Adams Analytical centrifuge (Model CT 3201) for 15 minutes at 3200 RPM. After centrifugation, a 2 mL aliquot of each supernatant was removed and precipitated with acetone. The precipitate was filtered, and the filter cake was washed with acetone, dried and weighed. Supernatants from the functionalized chemically-converted graphenes 1a-1d were dark solutions having some sedimentation, whereas the supernatant from the surfactant-stabilized, chemically-converted graphene was colorless. Since all material separated from the surfactant-stabilized, chemically-converted graphene supernatant, the equilibrium solubility was taken to be near zero. Based on the recovered precipitate weights from the functionalized chemically-converted graphenes, the solubilities of the functionalized chemically-converted graphenes were as follows: 1a, 0.25 mg/mL; 1b, 0.45 mg/mL; 1c, 0.30 mg/mL and 1d, 0.50 mg/mL.

Example 8

Pore-Filling Efficiency of Graphite Oxide and Chemically-Converted Graphenes

As a model of the ability of graphenes to fill pores during drilling fluid applications, solutions of graphite oxide and chemically-converted graphenes were subjected to several different filtration conditions using filters having pores of comparable sizes to those occurring in rock formations. The results hereinbelow demonstrate that graphite oxide and chemically-converted graphenes are effective in blocking pores of filters. Blocking filter pores is considered to be illustrative of pore blocking in geological rock formations.

A graphite oxide solution was prepared by dissolving 100 mg of graphite oxide in 1000 mL of 0.001 M NH$_4$OH (graphite oxide concentration=0.1 mg/mL). The mixture was sonicated for 1 hour (Fisher Scientific FS110H) to hasten dispersion of the graphite oxide. A second solution of graphite oxide was prepared in 1% SDBS solution by dissolving 1000 mg of graphite oxide in the surfactant solution to provide a surfactant-stabilized graphite oxide concentration of 1 mg/mL.

Solutions of surfactant-stabilized, chemically-converted graphene were prepared in a manner similar to that described in Example 3. For example, surfactant-stabilized, chemically-converted graphene solutions were prepared by the addition of 2 mL of 60% hydrazine hydrate to 200 mL of a surfactant-stabilized, graphite oxide solution, followed by heating at 90° C. for 24 h. Aqueous dispersions of chemically-converted graphene containing no surfactant were prepared by the addition of hydrazine hydrate to a solution of graphite oxide, followed by heating at 90° C. for 1 hour.

Gravity filtration results: The pore-blocking efficacy of a 0.1 mg/mL graphite oxide solution compared to deionized water was compared by gravity filtration. Fluted filter paper with a particle retention size of 25 μm was used for the analyses. For each solution, 100 mL of solution was poured into a fluted filter, and volume recovery was measured as a function of time for solution filtered into a graduated cylinder. Filtration rate data for each solution is presented in Table 1. The filtration rate for the 0.1 mg/mL graphite oxide solution was 1.67 mL/min as compared to 15.83 mL/min for deionized water. The rates were calculated based upon complete elution of water. In practice only about 95 mL of water was recovered, with the remaining ~5 mL absorbed by the filter paper. After the drying the filter paper used for the graphite oxide solution filtration, brown particulates of graphite oxide were found deposited on the filter paper.

TABLE 1

Gravity filtration rate data for deionized water and 0.1 mg/mL graphite oxide solution

| Time (min) | Water (Vol. Collected) | 0.1 mg/mL Graphite Oxide (Vol. Collected) |
|---|---|---|
| 1 | 47 | 42 |
| 2 | 75 | 60 |
| 4 | 90 | 75 |
| 6 | 95 | 80 |
| 16 | — | 90 |
| 57 | — | 95 |

TABLE 2

Vacuum filtration rate data for deionized water and 0.1 mg/mL graphite oxide solution

| Sample | Time for Filtration of 100 mL (min) | Comments |
|---|---|---|
| deionized water | 0.216 | Very fast |
| graphite oxide | 85 | Brown film of graphite oxide remained on the membrane |

Figure 9:
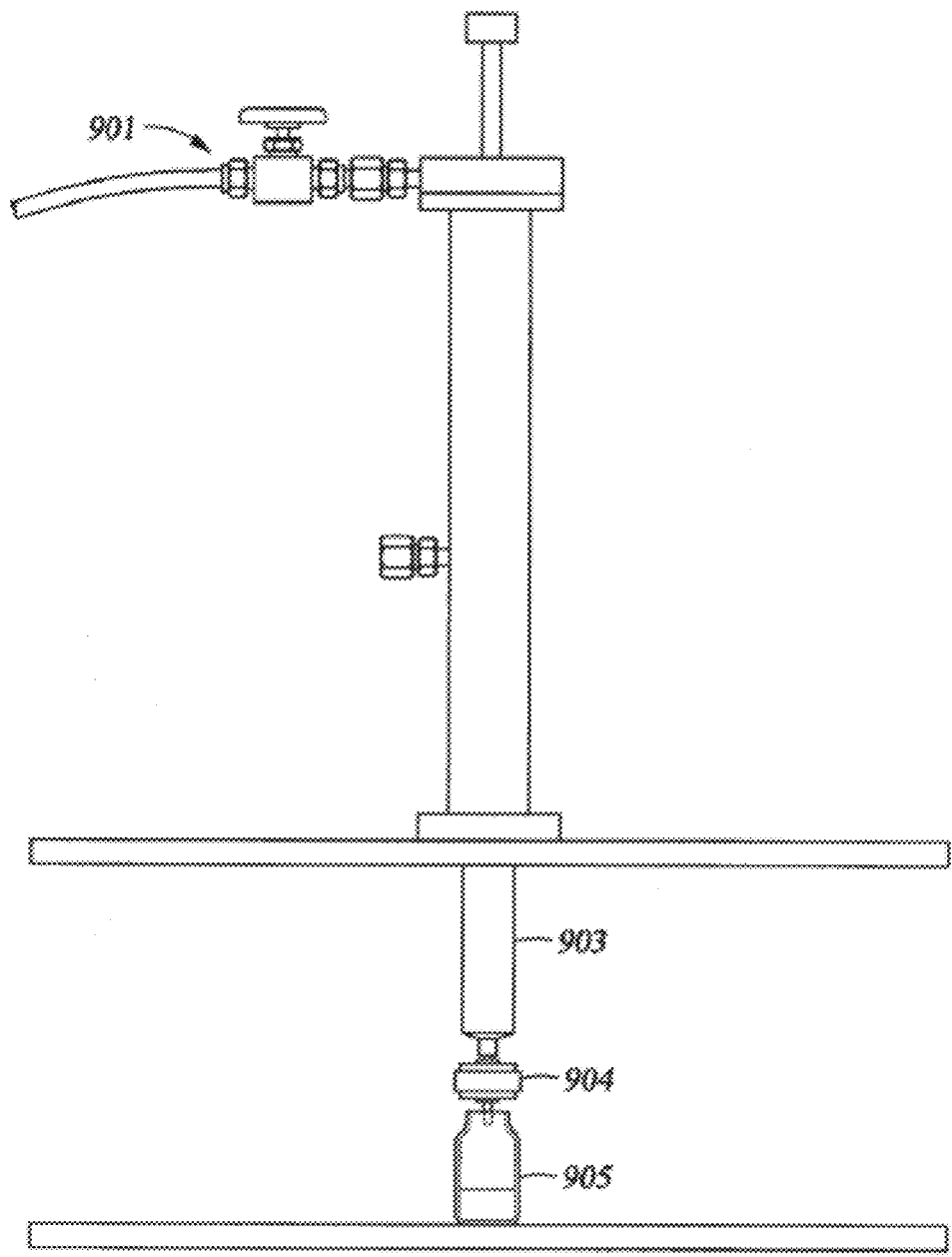
FIG. 9 presents a pressurized filtration apparatus used herein.

Pressure filtration results: Pressure filtration of water, graphite oxide and chemically-converted graphene solutions was conducted using custom-built equipment similar to standard American Petroleum Institute (API) testing equipment. A photograph of the pressure filtration apparatus is shown in FIG. 9. For filtration rate measurements made with the pressure filtration apparatus 900, a graphite oxide or chemically-converted graphene solution 903 was drawn into a syringe and fitted to filter assembly 904. The solution 903 in the syringe was then subjected to about 100 psi pressure supplied by nitrogen line 901, which applies pressure to a pressurizing piston. Filtered solution 905 was produced upon passage of solution 903 through filter assembly 904. Three different membranes were evaluated using the pressure filtration apparatus 900: Millipore Millex GP PES (porosity 0.22 μm); Whatman Paradise PES (porosity 0.45 μm); and Whatman 50 (porosity 2.7 μm).

Filtrations were conducted with 25 mL graphite oxide solutions for Millipore Millex GP and Whatman Paradisc PES, and all of the solution was allowed to bleed out of the pressure filtration apparatus 900. Filtrations were conducted at 80 psi or 100 psi for these membranes. For filtrations involving Whatman 50, a 30 mL volume of the solution was used, and the volume eluted after one hour was recorded. For Whatman 50 filtrations, the applied pressure was 100 psi. Pressure filtration rate data is presented in Tables 3 and 4.

TABLE 3

Pressure filtration rate data for deionized water and a 0.1 mg/mL graphite oxide solution on Whatman Paradisc PES and Millipore Millex GP membranes

| Sample | Membrane | Pressure (psi) | Time for Elution of 100 mL (sec) | Filtration Rate (mL/min) | Observation |
|---|---|---|---|---|---|
| 0.1 mg/mL graphite oxide | Whatman Paradisc PES | 100 | 73 | 82.19 | Filtrate is brown, some graphite oxide passes through the membrane |
|  | Millipore Millex GP | 100 | 541 | 11.09 | Filtrate is clear and colorless |
|  | Millipore Millex GP | 80 | 930 | 6.45 | Filtrate is clear and colorless |
| Water | Millipore Millex GP | 80 | 6 | 1000 |  |

Vacuum filtration results: Deionized water and the 0.1 mg/mL graphite oxide solution in 0.001 M $NH_4OH$ solution were filtered using a Filtropur V25 vacuum system fitted with a cellulose acetate membrane (porosity: 0.22 μm). Each solution (100 mL) was passed through the cellulose acetate membrane while in-house vacuum was applied during the filtration step. Filtration rate data for each solution presented in Table 2 was based on the time required for complete passage of the 100 mL solution through the membrane. The filtration rate for deionized water was 463 mL/min, whereas the filtration rate for 0.1 mg/mL graphite oxide was 1.17 mL/min. A brown film of graphite oxide remained after filtration on the membrane used for graphite oxide filtration.

TABLE 4

Pressure filtration rate data for deionized water, a 0.1 mg/mL graphite oxide solution, a 0.1 mg/mL chemically-converted graphene solution, and a 1 mg/mL chemically-converted graphene solution on a Whatman 50 membrane at 100 psi

| Sample | Volume collected after 1 hour (mL) | Filtration Rate (mL/min) | Notes |
|---|---|---|---|
| 0.1 mg/mL graphite oxide in 0.001M $NH_4OH$ | 17 | 0.28 | After 9 mL, the filtrate started to become clear |

TABLE 4-continued

Pressure filtration rate data for deionized water, a 0.1 mg/mL graphite oxide solution, a 0.1 mg/mL chemically-converted graphene solution, and a 1 mg/mL chemically-converted graphene solution on a Whatman 50 membrane at 100 psi

| Sample | Volume collected after 1 hour (mL) | Filtration Rate (mL/min) | Notes |
|---|---|---|---|
| 0.1 mg/mL chemically-converted graphene in 0.001M NH$_4$OH | 9 | 0.15 | Clear filtrate throughout |
| 1 mg/mL chemically-converted graphene in 1% SDBS | 6 | 0.10 | After 5 mL, the filtrate started to become clear |
| 0.5 mg/mL graphite oxide in 0.001M NH$_4$OH | 6 | 0.10 | After 3 mL, the filtrate started to become clear |
| Water | NA | 500 | Complete elution in 3.60 s |

Among the membranes tested, Millipore Millex GP PES filter media (0.22 μm porosity) was successful in retaining graphite oxide and chemically-converted graphene completely, as evidenced by a clear and colorless filtrate. Whatman Paradise PES and Whatman 50 allowed at least some graphite oxide and chemically-converted graphene to pass through the membranes. Filtration rates varied from 0.10 mL/min to 0.28 mL/min for graphite oxide and chemically-converted graphene solutions on Whatman 50 membranes. For Millpore Millex GP PES membranes, filtration rates varied between 6.45 mL/min and 11.09 mL/min for graphite oxide.

From the foregoing description, one skilled in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure, which is defined in the following claims.

What is claimed is the following:

1. A drilling fluid comprising a graphene, wherein the graphene is selected from the group consisting of chemically converted graphene, chemically converted graphene prepared by a reduction of graphite oxide, chemically converted graphene functionalized with a plurality of aryl groups, graphene functionalized with a plurality of aryl groups, graphene functionalized with a plurality of alkyl groups, functionalized graphite oxide, graphite oxide that has been functionalized through esterification or amidation of carboxylic acid groups, graphite oxide that has been functionalized with a plurality of alkyl groups, graphite oxide that has been functionalized with a plurality of aryl groups, reduced graphite oxide, and combinations thereof.

2. The drilling fluid of claim 1, wherein the graphene comprises chemically converted graphene functionalized with a plurality of aryl groups, wherein the aryl groups are selected from the group consisting of p-chlorophenyl, p-nitrophenyl, p-methoxyphenyl, p-bromophenyl, p-carboxyphenyl and combinations thereof.

3. The drilling fluid of claim 2, wherein the aryl groups are covalently bound to carbon atoms on the graphene; and wherein the aryl groups are introduced with a diazonium species.

4. The drilling fluid of claim 1, wherein the graphene comprises about 0.0001% to about 10% by volume of the drilling fluid.

5. The drilling fluid of claim 1, wherein the graphene comprises about 0.01% to about 0.1% by volume of the drilling fluid.

6. The drilling fluid of claim 1, wherein the graphene comprises chemically converted graphene prepared by a reduction of graphite oxide, wherein the reduction of graphite oxide is conducted with hydrazine.

7. The drilling fluid of claim 1, further comprising a surfactant.

8. The drilling fluid of claim 1, wherein the graphene is functionalized.

9. The drilling fluid of claim 1, wherein the graphene comprises graphite oxide that has been functionalized through esterification or amidation of carboxylic acid groups, and wherein the esters and amides comprise polyhydroxylated or polyaminated functionalities.

10. The drilling fluid of claim 1, wherein the graphene comprises chemically converted graphene that is suspended in a surfactant.

11. The drilling fluid of claim 1, wherein the graphene comprises graphite oxide that has been functionalized with a plurality of aryl groups, wherein the plurality of aryl groups comprise functional groups to enhance water solubility, and wherein the functional groups are selected from the group consisting of hydroxyls, polyhydroxyls, oligomeric ethylene oxides, poly(ethylene oxide) pendant groups, and combinations thereof.

12. A method for making a drilling fluid comprising a graphene, said method comprising:
   providing a graphene, wherein the graphene is selected from the group consisting of chemically converted graphene, chemically converted graphene prepared by a reduction of graphite oxide, chemically converted graphene functionalized with a plurality of aryl groups, graphene functionalized with a plurality of aryl groups, graphene functionalized with a plurality of alkyl groups, functionalized graphite oxide, graphite oxide that has been functionalized through esterification or amidation of carboxylic acid groups, graphite oxide that has been functionalized with a plurality of alkyl groups, graphite oxide that has been functionalized with a plurality of aryl groups, reduced graphite oxide, and combinations thereof;
   providing a drilling fluid; and
   dispersing the graphene in the drilling fluid.

13. The method of claim 12, wherein the graphene comprises chemically converted graphene functionalized with a plurality of aryl groups, wherein the aryl groups are selected from the group consisting of p-chlorophenyl, p-nitrophenyl, p-methoxyphenyl, p-bromophenyl, p-carboxyphenyl and combinations thereof.

14. The method of claim 13, wherein the aryl groups are covalently bound to carbon atoms on the graphene; and wherein the aryl groups are introduced with a diazonium species.

15. The method of claim 12, wherein the graphene comprises about 0.0001% to about 10% by volume of the drilling fluid.

16. The method of claim 12, wherein the graphene comprises about 0.01% to about 0.1% by volume of the drilling fluid.

17. The method of claim 12, wherein the graphene is functionalized.

18. The method of claim 12, further comprising suspending the graphene with a surfactant.

19. The method of claim 12, wherein the graphene comprises graphite oxide that has been functionalized through esterification or amidation of carboxylic acid groups, and wherein the esters and amides comprise polyhydroxylated or polyaminated functionalities.

20. The method of claim 12, wherein the graphene comprises chemically converted graphene that is suspended in a surfactant.

21. The method of claim 12, wherein the graphene comprises graphite oxide that has been functionalized with a plurality of aryl groups, wherein the plurality of aryl groups comprise functional groups to enhance water solubility, and wherein the functional groups are selected from the group consisting of hydroxyls, polyhydroxyls, oligomeric ethylene oxides, poly(ethylene oxide) pendant groups, and combinations thereof.

22. A drilling fluid comprising a nanoplatelet additive, wherein the nanoplatelet additive is selected from the group consisting of exfoliated clays and expanded and mechanically sheared mica.

* * * * *